(12) United States Patent
Frosythe et al.

(10) Patent No.: US 6,832,847 B2
(45) Date of Patent: Dec. 21, 2004

(54) CYCLE WHEEL SAFETY LIGHTING SYSTEM

(76) Inventors: Gary Frosythe, 7570 Wilbur Rd., New Albany, OH (US) 43054; Donn V. Stoutenburg, 239 Drakewood Rd., Westerville, OH (US) 43081

( * ) Notice: Subject to any disclaimer, the term of this patent is extended or adjusted under 35 U.S.C. 154(b) by 0 days.

(21) Appl. No.: 10/322,022

(22) Filed: Dec. 17, 2002

(65) Prior Publication Data

US 2003/0112632 A1 Jun. 19, 2003

Related U.S. Application Data

(60) Provisional application No. 60/341,709, filed on Dec. 17, 2001.

(51) Int. Cl.$^7$ .............................. F21V 33/00; B62J 6/00
(52) U.S. Cl. ........................ 362/473; 362/84; 362/276; 362/802; 340/463
(58) Field of Search ................................. 362/473, 802, 362/500, 84, 183, 227, 276, 192–193; 340/432, 463

(56) References Cited

U.S. PATENT DOCUMENTS

| | | | |
|---|---|---|---|
| 4,763,230 A | | 8/1988 | Cummings et al. ............ 362/78 |
| 5,121,305 A | | 6/1992 | Deed et al. .................... 362/72 |
| 5,584,561 A | | 12/1996 | Lahos ........................... 362/72 |
| 5,720,651 A | * | 2/1998 | Chien ........................... 451/95 |
| 5,839,814 A | * | 11/1998 | Roberts ....................... 362/545 |
| 6,170,968 B1 | * | 1/2001 | Caswell ....................... 362/469 |
| 6,186,635 B1 | | 2/2001 | Peterson et al. .............. 362/84 |
| 6,422,714 B1 | * | 7/2002 | Hubbell ....................... 362/84 |

* cited by examiner

*Primary Examiner*—Alan Cariaso
*Assistant Examiner*—Ali Alavi
(74) *Attorney, Agent, or Firm*—David A. Greenlee

(57) ABSTRACT

A Cycle Wheel Safety Light System uses double-sided shaped A-C electro-luminescent light panels, spaced about the wheels of a bicycle. A DC battery powers the panels via a DC-AC inverter. Alternatively, an alternator mounted between the wheel axle and frame utilizes the bicycle rider's motive power as the source of energy. Another variation combining the best features of both the battery and inverter is use of an alternator to charge (via a rectifier) a smaller battery or other energy storage device such as a 'supercap'. The panels may be of various colors to improve the "WOW!" factor and encourage adolescent use.

11 Claims, 2 Drawing Sheets

US 6,832,847 B2

CYCLE WHEEL SAFETY LIGHTING SYSTEM

RELATED APPLICATIONS

This application claims priority of Provisional Patent Application Ser. No. 60/341709, filed Dec. 17, 2001.

BACKGROUND OF THE INVENTION

1. Technical Field

The present invention relates to a system for identifying a bicycle during operation during periods of low light, such as dawn, dusk and night hours, where visibility to approaching vehicular traffic is diminished and illumination of objects is impaired.

2. Description of the Prior Art

Riders of bicycles, mopeds and similar vehicles frequently ride in the streets during periods of diminished light, especially at dusk. This often occurs for child cyclists during summertime when they are away from home playing or involved in organized activities, such as sports. Also, many adults ride bicycles for transportation and cannot always time their ride time to occur only bright daylight hours. In addition, bicyclists are frequently caught away from home base at the onset of rain showers, when light is diminished due to lack of sun and the incidence of rain, and are forced to travel at those times.

In all these instances, the diminished lighting poses serious risk of inadequate visibility of the cyclist to motorists driving cars and trucks, and the all-too-real possibility of being struck, resulting in serious injury or worse. Thus, there long has been a real need for reliable safety lighting to enable motorists to clearly see and identify cyclists during periods of diminished lighting.

Many different types of lighting have been developed and are in use, including battery-powered and generator-powered headlights, various types of handlebar, seat and frame mounted reflectors facing forward and rearward, cycle-mounted blinking strobe lights, and wheel spoke mounted reflectors facing sideways to identify bicycles during dusk or night operations. None of these adequately positively identifies a bicyclist to motorists at a sufficiently safe distance.

In addition, other types of clothing, accessory and helmet mounted lighting systems, such as shown in U.S. Pat. No. 5,649,755—Rapisarda, U.S. Pat. No. 6,086,213—Holce, U.S. Pat. No. 5,245,517—Fenton, U.S. Pat. No. 6,007,213—Baumgartner, and U.S. Pat. No. 5,559,680—Tabanera. These all require that the rider dutifully wear the jacket, helmet or bib, or mount the storage pack on the bicycle.

Yet others have proposed lighting systems for bicycle wheels that are battery powered. U.S. Pat. No. 5,121,305—Deed et al discloses a sinuous tube of LEDs threaded through wheel spokes that are battery powered, while U.S. Pat. No. 6,186,635—Peterson et al shows a spoke-mounted triangular light that is intermittently powered by a battery. In U.S. Pat. No. 5,584,561—Lahos discloses a spoke-mounted light that is powered by a wheel generator and includes a capacitor storage device for power when the wheel is not in motion. There has been no known commercialization of any of these devices. Other devices use pulsing lights mounted on the bicycle wheel spokes.

Children are notorious for forgetting to wear or use safety devices, usually thinking of them as nuisances. Since the most at-risk cyclists are children and adolescents, there is a need for a bicycle safety light that possesses a sufficient "WOW!" factor (a "cool" device that all kids will want) so that it is desirable and use is mostly assured. There is a need for a bicycle lighting system which is visible to approaching traffic and attractive to the children and youth so that they will be motivated to use and maintain the system in a functional condition, thus assuring use of the safety feature.

SUMMARY OF THE INVENTION

It is an object of this invention to provide a bicycle lighting system that is very visible to approaching motorists and other traffic.

It is another object of this invention to provide a bicycle safety light system that will be simple to use and maintain, thereby assuring a high level of use.

The present invention features a system of Electro-Luminescence (E-L) light panels, mounted on bicycle or other cycle wheels, that are arranged and shaped such that, when the wheels are turning, the panels present what appears to be a rotating bright disc, pie shapes of light or other shapes, that have high visibility from sufficient distances to adequately apprise motorists of the presence of the cyclist. Other light panels may be mounted on the bicycle frame, seat and handlebars to provide additional visibility. Unique power means are also presented as part of this invention.

In one aspect, this invention features a cycle wheel safety lighting system having a plurality of electro-luminescent panels spaced about the wheels of a bicycle for rotation therewith, electrical power means to energize the light emitting panels causing the panels to light up, and power control means for controlling delivery of electrical power to the panels to provide a bright, pulsating visual image when the cycle is in motion.

These and other objects and features of this invention will become more readily apparent upon reference to the following detailed description of preferred and other embodiments, as illustrated in the accompanying drawings.

DESCRIPTION OF A PREFERRED EMBODIMENT

Figure 1:
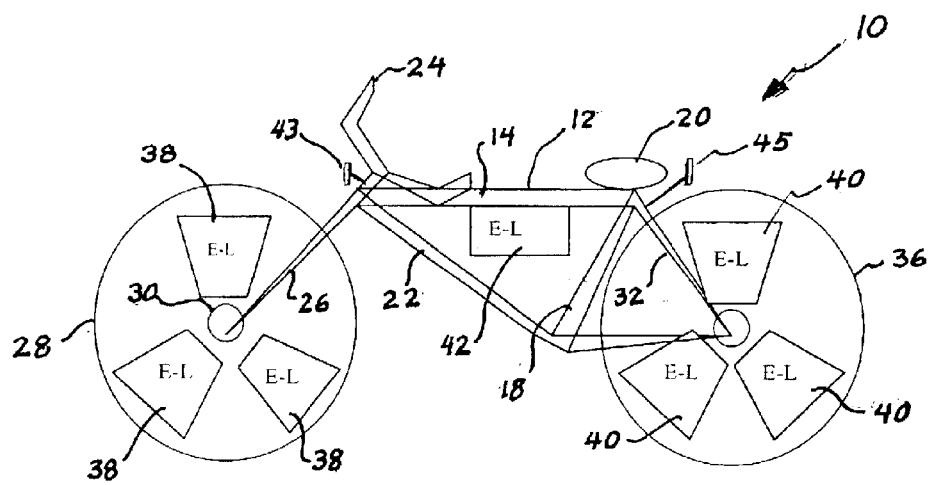
FIG. 1 is a schematic side view of a bicycle having the lighting system of this invention, showing exemplary light panel locations.

FIG. 1 shows a schematic side view of a bicycle 10 having a lighting system according to this invention. Bicycle 10 includes the usual frame 12, having a horizontal bars 1 that interconnects a steering post 16 and a rear post 18, that mounts a seat 20 for the rider, not illustrated. An angled main frame bar 22 completes frame 12. Steering post 16 mounts handlebars 24 and interconnected front fork 26 that mounts a spoked front wheel 28 (spokes not illustrated) having a hub 30. A forked rear brace 30 and rear post 18 mount the ends of a rear fork 32 that mounts a hub 34 of a spoked rear wheel 36. The conventional chain-and-sprocket drive mechanism is not shown.

Three identical trapezoidal electro-luminescent (E-L) light panels 38 are spaced about and secured to front wheel 26, while similar panels 40 are spaced about and secured to rear wheel 36. Another electro-luminescent light panel 42 is mounted on frame bar 14, while a front facing panel 43 and a rear facing panel 45 are mounted on frame 12 for fore and aft visibility. Panels 38, 40 and 42 are double-sided and, when activated, emit light across the entire expanse of both sides of the panels, thus marking the cycle for illumination and identification by motorists approaching the cycle 10 from either side. The side-facing panels 38, 40, 42 are visible from all angles from the side. However, visibility will gradually diminish as the viewing angle approaches 90°, i.e. directly front or rear of cycle 10, which would be rare. Front and rear facing panels 43 and 45 accommodate this eventuality.

Figure 2:
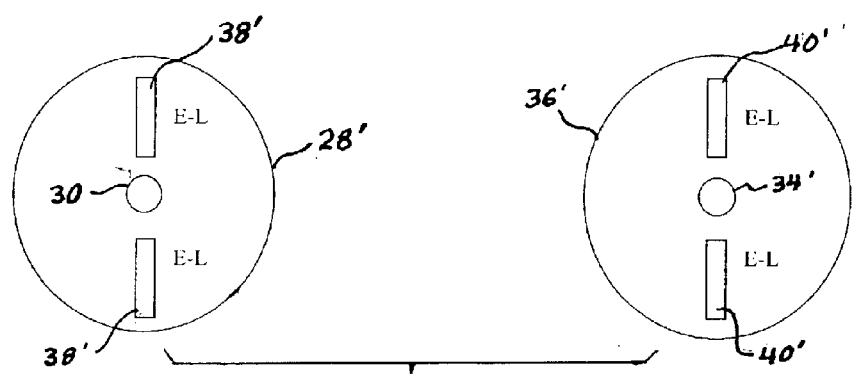
FIG. 2 is schematic view of an alternate arrangement of lighting panels on the wheels.

An alternate arrangement of E-L panels is shown in FIG. 2. Here two rectangular panels 38' are spaced 180° apart on front wheel 28', while similar panels 40' are similarly mounted on rear wheel 36'. Panels 38' and 40' are preferably double-sided.

Figure 3:
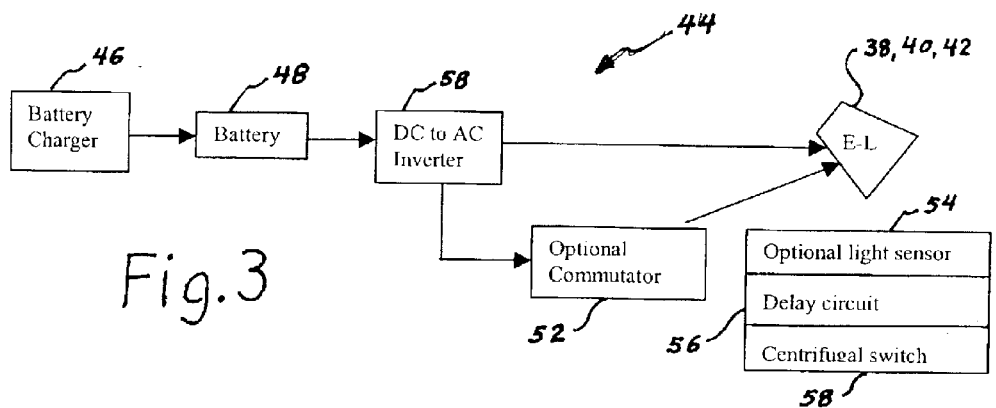
FIG. 3 is an electrical schematic of the lighting system of FIG. 1.

FIG. 3 depicts a schematic of an electrical circuit 44 for activating electro-luminescent panels 38, 40 and 42. The elements of circuit 44 include a battery charger 46, which charges a battery 48, and a DC-AC inverter 50 to convert the DC battery current to AC current for use by the panels. Optional elements include a commutator 52, a light sensor 54, a delay circuit 56 and a centrifugal switch 58. Battery 48 can be a set of conventional rechargeable type batteries of 9 volts or other.

In operation, DC current from battery 48 will be converted to AC current by inverter 50. Of course battery charger 46 would not be needed if battery 48 is a non-rechargeable battery. The optional commutator 52 can be used to transfer current to panels 38 and 40 located within the spokes of rotating wheels 26, 36 when battery 48 and inverter 50 are mounted on the cycle frame—outside the confines of the rotating wheels 28 and 36. Conversely, a commutator 52 would be required to transfer energy to panel 42 mounted on the non-rotating bicycle frame 12 if battery 48 and inverter 50 were mounted within the spokes of rotating wheels 28 and 36.

Optional light sensor 54 may be used to turn off current to the E-L light panels 38, 40, 42 during daylight conditions, when they are not necessary for cycle safety. Optionally, a centrifugal switch 58 can be mounted inside the rotating wheels 28 and 36 to light panels 38, 40 and 42 only when bicycle 10 is in motion. This could operate in conjunction with a suitable circuit delay 56 to conserve battery power. The delay would maintain the panel lights ON for short periods of time when the bicycle ceases moving, such as when paused at a stoplight or stop sign.

Figure 4:
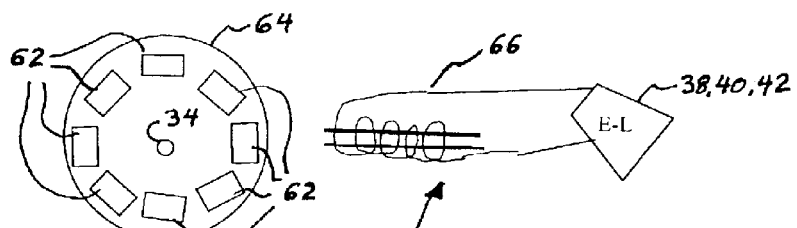
FIG. 4 is a schematic diagram of an alternate means for powering the lighting system of this invention.

FIG. 4 shows a schematic diagram of a circuit 60 for powering panels 38, 40 and 42. This consists of a suitable winding around a ferrous core fastened to the rotating wheel and thus rotating past a set of magnet means fixed to the fork and not rotating. The winding would be connected to the light panels mounted within the spokes of the wheel. As the wheel rotates past the fixed magnets the oscillating magnetic flux would induce an AC current in the winding of the core. This AC current provides the energy to cause the panels to emit light energy on both sides of the wheel without necessitating use of a battery or any of the aforementioned optional devices of FIG. 3.

Circuit 60 includes a circular array of magnets 62 mounted on a plate 64 fixedly mounted on frame 12. A magnetic coil 66 (i.e. a coil around ferrous core) is fixed to and rotates with wheel 28 and/or 36 in close proximity to the array of magnets 62 such that the magnet flux induced within the coil to generate alternating current. This would obviate the need for DC-AC inverter 50.

Figure 5:
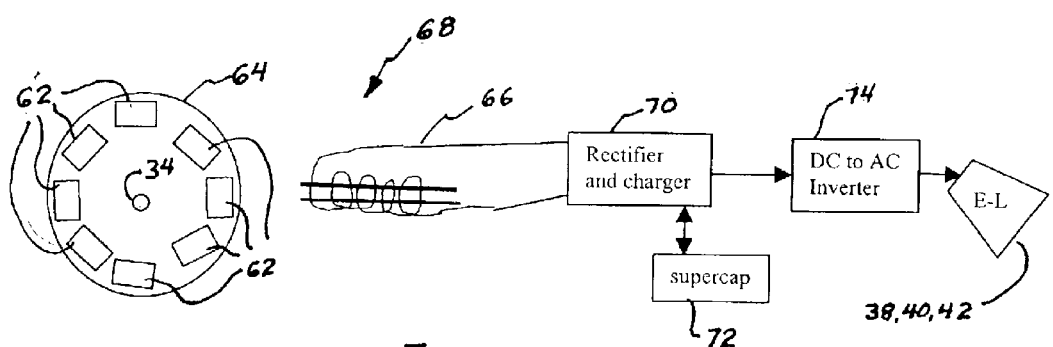
FIG. 5 is a schematic diagram of yet another embodiment of means for powering the lighting system of this invention.

FIG. 5 shows a modified form 68 of the circuit of FIG. 4, which combines features of both the first and second embodiment wherein the alternator operates through a rectifier and charging circuit to charge a smaller battery or other energy storage means such as a 'supercap'. In addition to the magnets 62 on plate 64 and coil 66, a rectifier and charger 70, a supercap, or small rechargeable battery, 72, and a DC-AC inverter 74 are used to power E-L panels 38, 40 and 42. The smaller battery or 'supercap' 72 powers inverter 74 and provides power to energize and light the light panels for a short time when the cycle ceases motion, such when paused at a stop sign or light. This embodiment avoids the necessity for a separate charger and assures that the batteries are fully charged and ready to use.

Thus the Bicycle Wheel Safety Light System of this invention uses trapezoidal- or rectangular-shaped area light panels, which consist of electro-luminescence material. Other light emitting area materials could also be used. The electro-luminescent light panels preferably use Alternating Current power. Use of a DC battery requires a DC-AC inverter to energize the light panels. A power source that avoids use of batteries, battery charger and inverter is an alternator mounted between the wheel axle and frame to utilize the bicycle rider's motive power as the source of energy. Another variation combining the best features of both the battery and inverter is use of an alternator to charge (via a rectifier) a smaller battery or other energy storage device such as a 'supercap'.

In all embodiments, the spacing of electro-luminescent panels, which can be trapezoidal, arcuately segmental, or triangular, creates a bright, pulsating visual image when viewed from the side. Such a display is unprecedented and impossible for a motorist to not notice immediately. Also, the use of electro-luminescent material in the panels provides an enormous amount of light for the power input when compared to LEDs or normal incandescent lamps. The net effect is to greatly enhance bicycle safety. In addition, various colors of panels can be used, and in combination to provide an unprecedented "WOW!" effect. This will greatly increase the probability that adolescents will want to use this safety device, resulting in a high degree of use and greatly improved bicycle safety.

While only several embodiments of this invention are shown and described, obvious modifications will become readily apparent to those skilled in the art, and are within the scope of this invention, as defined by the following claims.

We claim:

1. A cycle wheel safety lighting system for a cycle having a structure including a frame and at least one wheel, comprising a plurality of electro-luminescent panels, at least some of which are spaced about said one wheel for rotation therewith, with the other panels being located elsewhere on other structure of the bicycle, electrical power means mounted on one of the wheel or the other structure to energize the light emitting panels and cause the panels to light up, power control means for transferring electrical power between the wheel and other structure and controlling delivery of electrical power to all of the panels to provide a bright visual image when the cycle is in motion.

2. The cycle wheel safety lighting system of claim 1, wherein, said other structure includes a frame and a second wheel, said electrical power means are located on said frame, at least some of said other panels are mounted on the second wheel, and the power control means include means for transferring electrical power to the panels on the both wheels.

3. The cycle safety lighting system of claim 1, wherein at least one of said other electro-luminescent panels is mounted on the bicycle frame facing at least one of the front and rear of the cycle.

4. The cycle safety lighting system of claim 2, wherein the electro-luminescent panels are AC-powered, and the power means comprises a DC power source and a DC-AC inverter.

5. The cycle safety lighting system of claim 4, wherein the panels include panels that emit at least two different colors of light.

6. The cycle safety lighting system of claim 4, wherein the electro-luminescent panels are AC-powered, and the power source is a battery.

7. The cycle safety lighting system of claim 6, wherein the battery is rechargeable, and including a battery charger.

8. The cycle safety lighting system of claim 6, wherein the power control means includes an on-off switch.

9. The cycle safety lighting system of claim 6, wherein the DC-AC inverter includes a low duty factor pulsing means to conserve battery, energy and enhance visibility by selectively pulsing the electro-luminescent panels.

10. The cycle safety lighting system of claim 6, wherein the power control means comprises a motion detector, a delay circuit, and an ambient light detection means for operating the electro-luminescent panels only when the cycle is in motion and for a predetermined period of time after cycle motion ceases and when ambient light is lower than a predetermined level.

11. The bicycle safety lighting system of claim 6, herein the electrical power means comprises an alternator proximate the wheel.

* * * * *

UNITED STATES PATENT AND TRADEMARK OFFICE
CERTIFICATE OF CORRECTION

PATENT NO.         : 6,832,847 B2                                            Page 1 of 1
APPLICATION NO. : 10/322022
DATED              : December 21, 2004
INVENTOR(S)       : Gary Forsythe and Donn Stoutenburg It is certified that error appears in the above-identified patent and that said Letters Patent is hereby corrected as shown below:

Title Page, Column 1 Item [75]
Inventors Name Gary "Frosythe" should read --Forsythe--

Signed and Sealed this

Twelfth Day of August, 2008

JON W. DUDAS
*Director of the United States Patent and Trademark Office*